(12) United States Patent  
Delgado

(10) Patent No.: US 7,453,050 B2
(45) Date of Patent: Nov. 18, 2008

(54) FLEXIBLE WELDING IMPLEMENT AND METHOD OF MANUFACTURING SAME

(75) Inventor: David Delgado, Rancho Cucamonga, CA (US)

(73) Assignee: Illinois Tool Works Inc., Glenview, IL (US)

( * ) Notice: Subject to any disclaimer, the term of this patent is extended or adjusted under 35 U.S.C. 154(b) by 564 days.

(21) Appl. No.: 10/679,880

(22) Filed: Oct. 6, 2003

(65) Prior Publication Data

US 2005/0072763 A1    Apr. 7, 2005

(51) Int. Cl.
*B23K 9/00* (2006.01)
*B23K 9/28* (2006.01)
*B23K 9/32* (2006.01)

(52) U.S. Cl. ............... 219/75; 219/137.51; 219/137.62; 219/137.9

(58) Field of Classification Search ............ 219/137.31, 219/137.51, 137.52, 137.62, 137.63, 137.9, 219/138, 144, 75

See application file for complete search history.

(56) References Cited

U.S. PATENT DOCUMENTS

| | | | | | |
|---|---|---|---|---|---|
| 3,281,571 | A | * | 10/1966 | Gilmore | 219/137.9 |
| 3,703,622 | A | * | 11/1972 | Kleppen, Jr. | 219/75 |
| 3,992,565 | A | * | 11/1976 | Gatfield | 174/15.7 |
| 3,999,033 | A | * | 12/1976 | Willgohs et al. | 219/137.51 |
| 4,145,595 | A | * | 3/1979 | Keller et al. | 219/75 |
| 5,166,496 | A | * | 11/1992 | Sarkissian | 219/137.51 |
| 5,403,987 | A | * | 4/1995 | Rehrig | 219/75 |
| 6,855,905 | B2 | * | 2/2005 | Delgado et al. | 219/74 |

* cited by examiner

*Primary Examiner*—Kevin P Kerns
(74) *Attorney, Agent, or Firm*—Fletcher Yoder

(57) ABSTRACT

A welding implement includes a torch having a flexible torch head. The torch head is operable to conduct electricity to a welding electrode disposed within the torch head. The welding implement may include a gas supply tube and a coiled wire spring operable to flexibly couple the gas supply tube to the torch head. The welding implement may include a torch that directs a fluid to flow axially through a spring coupled the torch head. The welding implement may also include a torch including a torch head and a tripod support system to flexibly support the torch head. Each of the legs of the tripod support system may include a spring.

21 Claims, 4 Drawing Sheets

FLEXIBLE WELDING IMPLEMENT AND METHOD OF MANUFACTURING SAME

BACKGROUND OF THE INVENTION

This section is intended to introduce the reader to various aspects of art which may be related to various embodiments of the present invention which are described and/or claimed below. This discussion is believed to be helpful in providing the reader with background information to facilitate a better understanding of various embodiments of the present invention. Accordingly, it should be understood that these statements are to be read in this light, and not as admissions of prior art.

Arc welding is a welding process in which an electric current is used to produce localized melting in a work piece. There are many different types of arc welding processes. One example of an arc welding process is TIG (Tungsten-Inert-Gas) welding (also known as gas tungsten arc welding, GTAW, or HELIARC). TIG welding is a type of arc welding process in which an electric arc is maintained between a welding implement, such as a hand-held torch, and a metal work piece. Typically, the welding implement includes a cylindrical electrode coupled to a torch head. The arc is produced by electricity flowing between the electrode and the work piece. Typically, the electrode is comprised of tungsten. The electrode is secured to a torch that is operable to couple electricity from a source of power to the electrode. Electricity is coupled to the torch by a power cable. A torch head is used to secure the electrode to the torch and to couple the electricity to the electrode.

Welding implements have been developed to enable the torch to have a degree of flexibility so that the electrode may be positioned relative to a user's hand. In a liquid-cooled torch, the flexibility is achieved by using a series of coiled tubes to secure the torch head to the torch. A shield gas is conveyed through the interior of one of the tubes. Additional tubes are used to convey cooling liquid to and from the torch head. The tubes are coiled around each other and may be flexed to reposition the torch head.

However, these welding implements may not have a high degree of flexibility. In addition, the flow of gas and/or cooling liquid through the coils may be affected by the heat loss created by the route that the gas and/or cooling liquid takes in flowing through the coils. In addition, manufacturing a welding implement with coiled tubing is time consuming and laborious.

Therefore, a desire exists for a flexible welding implement that provides improved flexibility over existing welding implements and provides better flow characteristics for fluids flowing through the flexible portions of the welding implement. In addition, a method of manufacturing a flexible welding implement that responds to these needs is desired.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
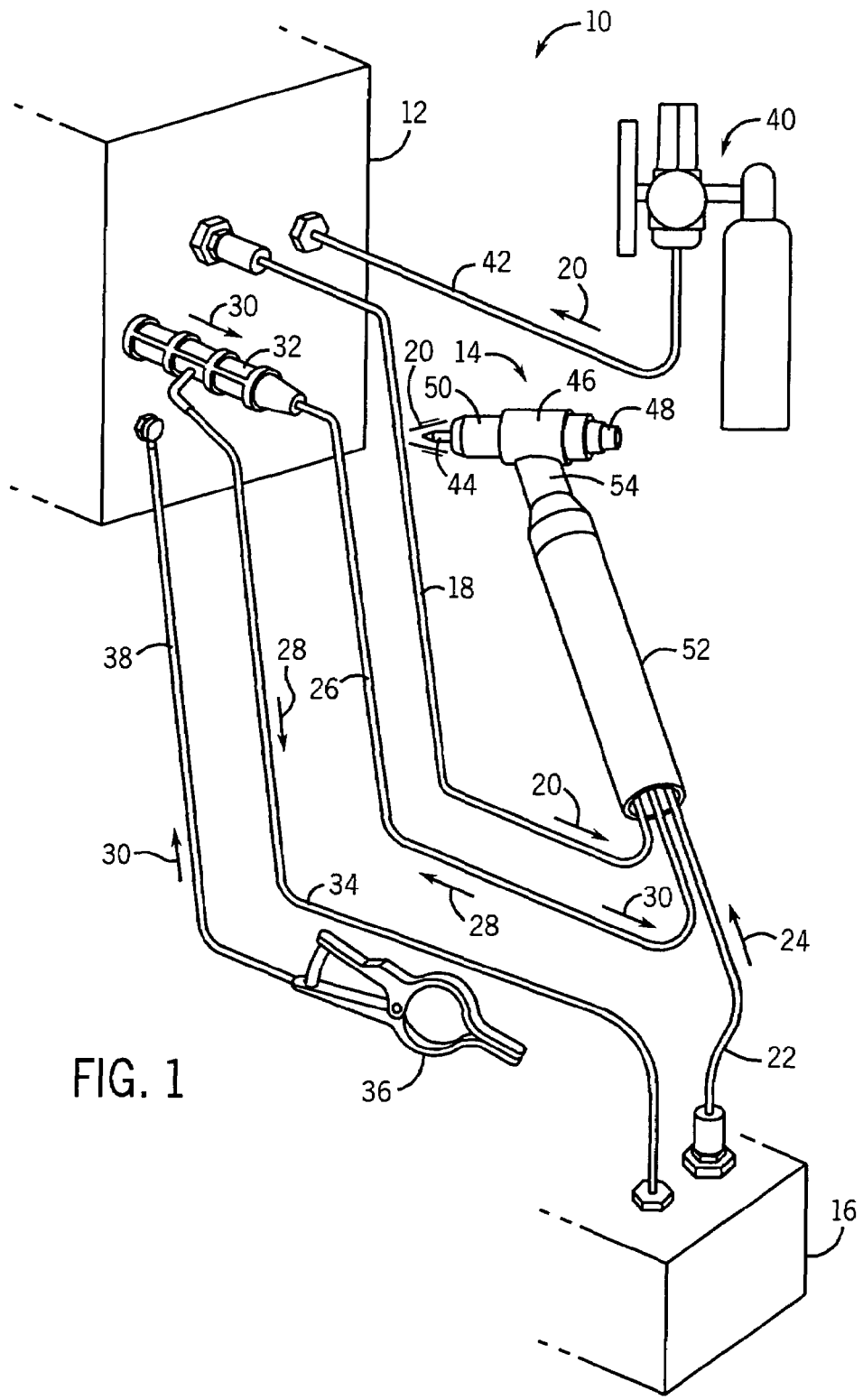
FIG. 1 is a perspective view of a liquid-cooled TIG welding system, in accordance with an exemplary embodiment of the present invention.

Referring generally to FIG. 1, a welding system 10 is illustrated. In the illustrated embodiment, the welding system 10 comprises a welding machine 12, a liquid-cooled TIG welding torch 14, and a liquid cooling unit 16. However, the techniques described herein are applicable to arc welding systems other than TIG welding systems. The welding machine 12 is operable to provide the power to enable a user to weld with the torch 14. The liquid cooling unit 16 is operable to provide a flow of liquid to remove heat from the torch 14 produced during welding operations.

A flexible gas hose 18 is coupled between the welding machine 12 and the torch 14 to enable the welding machine 12 to supply a shield gas 20 to the torch 14. A liquid hose 22 is coupled between the liquid cooling unit 16 and the torch 14 to enable the liquid cooling unit 16 to provide a supply of cooling liquid 24 to the torch 14. In addition, a power cable 26 is coupled between the torch 14 and the welding machine 12. The power cable 26 provides a flow path for heated cooling liquid 28 to flow from the torch 14, as well as to provide a path for electric current 30 to flow to the torch 14 from the welding machine 12. The power cable 26 has a connector 32 that is connected to the welding machine 12 to electrically couple the torch 14 to the welding machine 12. A liquid hose 34 is coupled to the connector 32 to provide a return path for the heated cooling liquid 28 to flow back to the liquid cooling unit 16. The illustrated system 10 comprises a clamp 36 and a return cable 38 for electrically connecting a work piece to the welding machine 12.

In the illustrated embodiment, a regulated gas cylinder 40 and hose 42 are provided to supply gas 20 to the welding machine 12. However, another source of gas 20 may be used. In addition, the regulated gas cylinder 40 or some other source of gas, may be connected directly to the torch 14. The liquid-cooled torch 14 is adapted to conduct electric current 30 to an electrode 44 secured to the torch 14 and to direct the flow of gas 20 from the torch 14. The liquid-cooled torch 14 has a torch head 46 for receiving the electrode 44 and gas 20. The electrode 44 is disposed through one end of the torch head 46. A back cap 48 is provided to seal the opposite end of the torch head 46. The torch 14 also comprises a nozzle 50 that is coupled to the torch head 46 to direct the gas 20 to flow from the torch 14 in a desired pattern.

Figure 2:
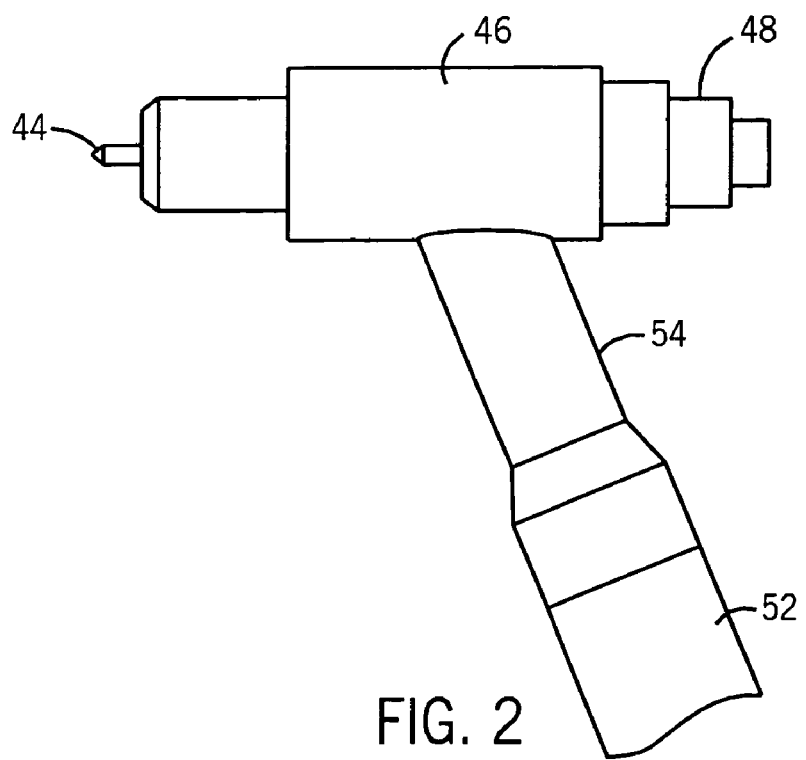
FIG. 2 is an elevation view of a flexible liquid-cooled welding torch in an un-flexed orientation, in accordance with an exemplary embodiment of the present invention.
Figure 3:
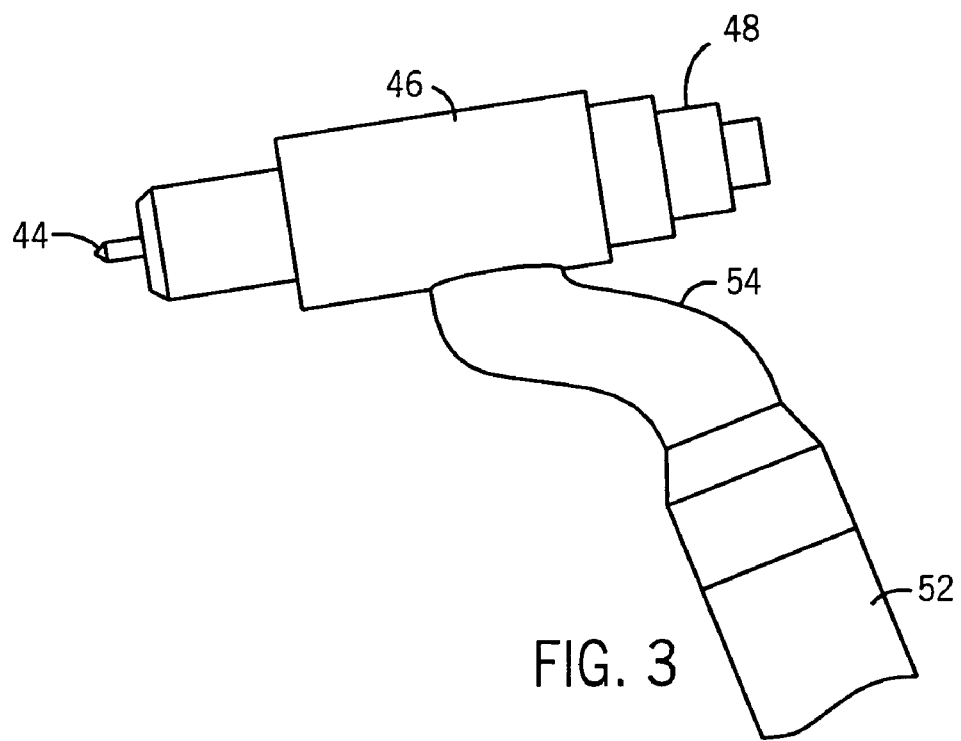
FIG. 3 is an elevation view of the flexible liquid-cooled welding torch of FIG. 2 in a flexed orientation.

Referring generally to FIGS. 1-3, a handle 52 is provided to enable a user to grip the torch 14. The torch 14 has a flexible portion 54 that enables the torch head 46 to be repositioned relative to the handle 52, i.e., the user's hand. Consequently, the electrode 44 may be repositioned relative to the handle 52. In FIG. 2, the torch 14 is illustrated in with the flexible portion 54 in a normal orientation. In FIG. 3, the torch 14 is illustrated in with the flexible portion 54 in a flexed orientation. Once oriented, the flexible portion 54 maintains the orientation of the torch head 46 relative to the handle 52. In the illustrated embodiment, an electrically insulating material is molded over the flexible portion 54 of the torch. In addition, the handle 52 is composed of an electrically insulating material. The insulating material and the handle protect a user from electrical shock.

Figure 4:
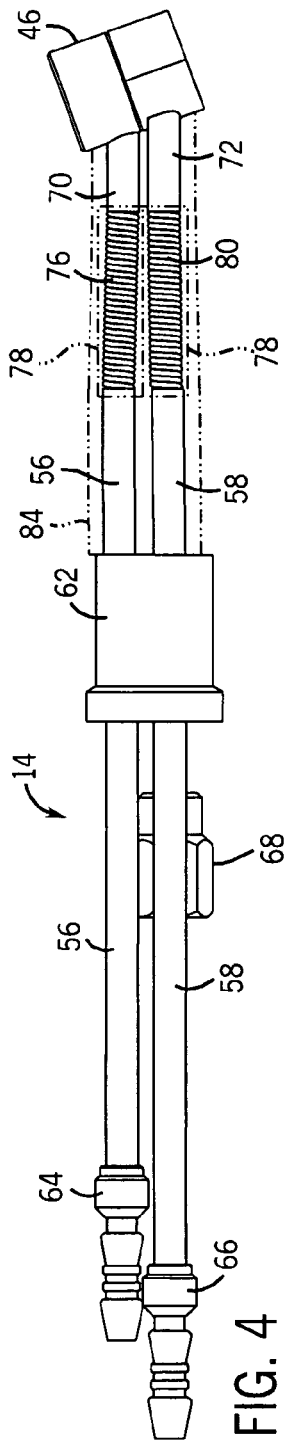
FIG. 4 is an elevation view of the internal components of a flexible liquid-cooled welding torch, in accordance with an exemplary embodiment of the present invention.
Figure 5:
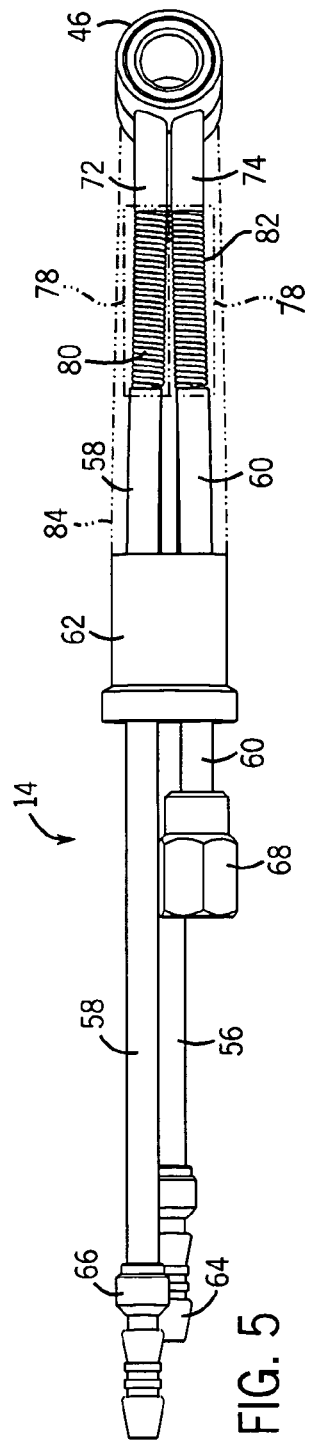
FIG. 5 is an elevation view of the internal components of a flexible liquid-cooled welding torch illustrated in FIG. 4 from a different perspective.

Referring generally to FIGS. 1, 4, and 5, the interior of the torch 14 is illustrated. The torch 14 comprises a first gas tube 56, a first liquid supply tube 58, and a first liquid return tube 60. The first liquid return tube 60 also serves to conduct electricity. A tube support 62 is provided to align and support the first gas tube 56, the first liquid supply tube 58, and the first liquid return tube 60. The handle 52 is disposed over the first gas tube 56, the first liquid supply tube 58, and the first liquid return tube 60.

The first gas tube 56 has a connector 64 for coupling gas from the gas hose 18 to the first gas tube 56. Similarly, the first liquid supply tube 58 has a connector 66 for coupling liquid from the liquid supply tube 58 to the liquid supply line 22. In addition, the first liquid return tube 60 has a power fitting 68 for coupling power from the power cable 26 to the first liquid return tube 60 and liquid from the first liquid return tube 60 to the power cable 26. In the illustrated embodiment, the connectors 64, 66 and power fitting 68 are secured to the tubes by brazing.

The torch 14 has a second gas tube 70 for coupling gas to the torch head 46. In addition, the torch 14 has a second liquid supply tube 72 for coupling liquid to the torch head 46 and a second liquid return tube 74 for coupling liquid from the torch head 46. In the illustrated embodiment, the second gas tube 70, the second liquid supply tube 72, and the second liquid return tube 74 are secured to the torch head 46 by brazing.

The first gas tube 56 is coupled to the second gas tube 70 by a spring 76. In the illustrated embodiment, heat shrink tubing 78 is disposed over the spring 76 to define a fluid flow path through the center of the spring 76. Gas flows through the first gas tube 56 and the heat shrink tubing 78 to the second gas tube 70. However, other methods may be used to from a seal around the spring 76 or otherwise define a flow path through the center of the spring 76. Similarly, a spring 80 is used to couple the first liquid supply tube 58 to the second liquid supply tube 72. In addition, a spring 82 is used to couple the first liquid return tube 60 to the second liquid return tube 74. The spring 82 also conducts electricity to the torch head 46. In the illustrated embodiment, spring 76, spring 80, and spring 82 are secured to the various tubes by brazing. Heat shrink tubing 78 is disposed over spring 80 and spring 82. The heat shrink tubing 78 also electrically insulates the three springs.

Figure 6:
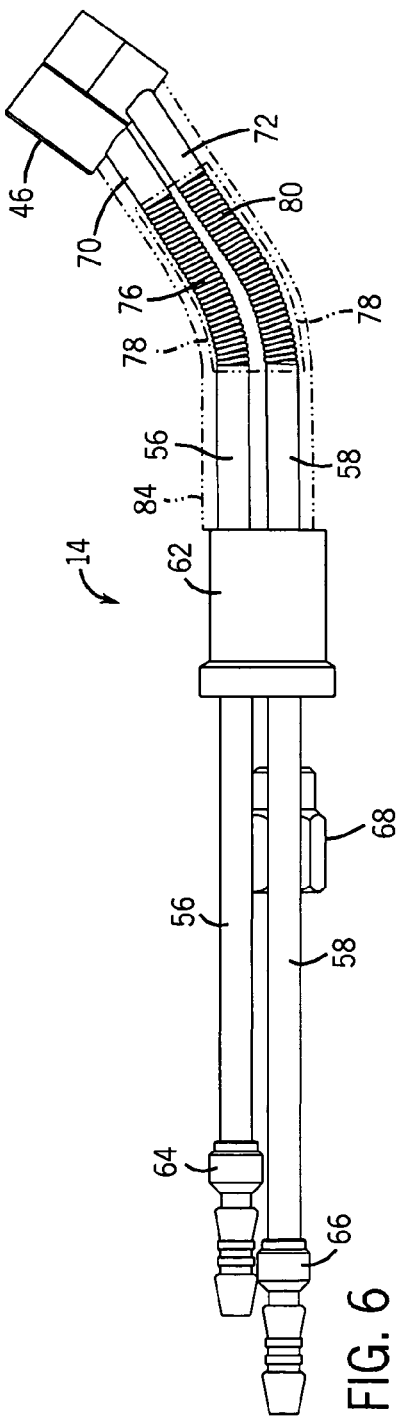
FIG. 6 is an elevation view of the internal components of the flexible liquid-cooled welding torch of FIG. 4 with the torch head flexed from the normal position illustrated in FIG. 4.

As illustrated in FIG. 6, the springs 76, 80, and 82 enable the torch head 46 to be flexed relative to the first gas tube 56, the first liquid supply tube 58, and the first liquid return tube 60. In addition, because there are three separate springs, the springs 76, 80, and 82 prevent twisting of the torch head 46. Furthermore, the fluids flow axially through the center of the heat shrink tubing 78 and the springs 76, 80, and 82, rather than helically within a helical tube. Thus, the fluid flow path is shorter in the present configuration than through a helically wound tube. Furthermore, the cross-sectional area of the flow path can be made greater in the present configuration for the same outer diameter. For all of these reasons, there is less head loss in the present configuration, enabling a better flow of fluids through the torch.

Referring again to FIGS. 4 and 5, after the various components are secured by brazing, an electrically insulating material 84 is molded over the springs 76, 80, and 82 and portions of the tubes. The insulating material 84 protects a user from electrical shock. In the illustrated embodiment, after the tube joints are brazed and before molding, the torch assembly is dipped in an adhesive to prepare the surfaces for molding.

Figure 7:
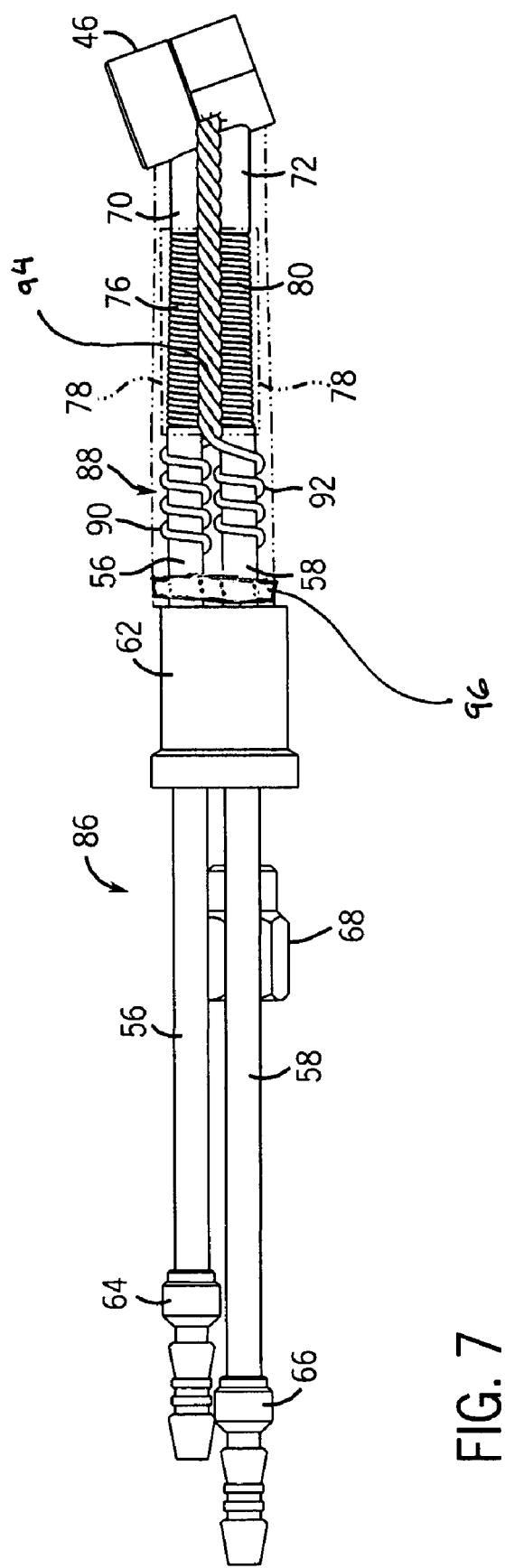
FIG. 7 is an elevation view of the internal components of an alternative embodiment of a flexible liquid-cooled welding torch.

Referring generally to FIG. 7, an alternative embodiment of a torch 86 is illustrated. In the alternative embodiment, the torch 86 has a center memory unit 88 that provides support to the three springs 76, 80, and 82. In this embodiment, the center memory unit 88 comprises three wires. Preferably, the three wires are comprised of solid copper wire. Each of the three wires of the illustrated center memory unit 88 is wound into a coil. One of the wires of the center memory unit 88 is wound into a first coiled portion 90 that is disposed over the first gas tube 56. A second wire is wound into a second coiled portion 92 that is disposed over the first liquid supply tube 58. A third wire is wound into a third coiled portion (not shown) that is disposed over the first liquid return tube 60. The three wires of the center memory unit 88 are braided together to form a braided portion 94. The center memory unit 88 is attached to the torch head 46, such as by soldering. The torch 86 also comprises a support member 96. In the illustrated embodiment, the support member 96 comprises a metal slug having three holes therethrough to enable the first gas tube 56, first liquid supply tube 58, and the first liquid return tube 60.

The embodiments described above provide a flexible liquid-cooled welding implement that uses coiled wire springs, rather than hollow tubes, to give the torch its flexibility. In addition, the gas and cooling liquid flow axially through the springs, rather than inside coiled tubes formed as springs. In addition, the embodiments describe a tripod support system that provides the torch with flexibility, while resisting twisting.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A flexible welding implement, comprising:
   a torch head operable to couple electricity to a welding electrode disposed therein;
   a cooling fluid supply tube operable to convey a cooling fluid to the torch head;
   a cooling fluid return tube operable to convey the cooling fluid from the torch head;
   a first biasing member comprising a helix of non-tubular material defining an axial flow path and operable to flexibly and fluidicly couple the cooling fluid supply tube to the torch head such that the cooling fluid flows axially through the flow path of the first biasing member; and a second biasing member comprising a helix of non-tubular material defining an axial flow path and operable to flexibly couple the cooling fluid return tube to the torch head.

2. The flexible welding implement as recited in claim 1, comprising:
a gas supply tube operable to convey a gas to the torch head; and
a third biasing member operable to flexibly couple the gas supply tube to the torch head.

3. The flexible welding implement as recited in claim 1, comprising a second cooling fluid supply tube secured to the torch head, wherein the cooling fluid supply tube is coupled to the second cooling fluid supply tube by the second biasing member.

4. The flexible welding implement as recited in claim 3, comprising a flexible tube disposed over the first biasing member to define a fluid channel for the cooling liquid to flow from the cooling fluid supply tube to the second cooling fluid supply tube axially though the center of the first biasing member.

5. The flexible welding implement as recited in claim 1, comprising a second cooling fluid return tube secured to the torch head, wherein the cooling fluid return tube is coupled to the second cooling fluid return tube by the second biasing member.

6. The flexible welding implement as recited in claim 2, comprising a second gas supply tube secured to the torch head, wherein the gas supply tube is coupled to the second gas supply tube by the third biasing member.

7. The flexible welding implement as recited in claim 5, comprising a second flexible tube disposed over the second biasing member and a third flexible tube disposed over the third biasing member.

8. The flexible welding implement as recited in claim 2, comprising a handle disposed over the gas supply tube, the cooling fluid supply tube, and the cooling fluid return tube.

9. A flexible welding implement, comprising:
a torch coupleable to a handle, comprising:
a torch head operable to receive a cooling liquid; and
a plurality of non-tubular coils disposed generally parallel with one another and with an axis of the handle within the torch to enable the torch head to be displaced relative to the handle, wherein the torch directs the cooling liquid to flow through the coils to and from the torch head.

10. The flexible welding implement as recited in claim 9, comprising a flexible tube disposed over the first coil and a portion of the first tube to define a fluid channel for the cooling liquid to flow axially though the first coil.

11. The flexible welding implement as recited in claim 10, wherein the flexible tube comprises heat shrink tubing.

12. The flexible welding implement as recited in claim 9, comprising a second coil disposed within the torch to enable the torch head to be displaced relative to the handle, wherein the torch is adapted to direct the cooling liquid to flow from the torch head axially through the second coil to a second tube.

13. The flexible welding implement as recited in claim 12, comprising a third coil disposed within the torch to enable the torch head to be displaced relative to the handle, wherein the torch is adapted to direct a gas to flow from a third tube axially through the third coil to the torch head.

14. The flexible welding implement as recited in claim 13, wherein the first tube is coupleable to a cooling liquid supply line, the second tube is coupleable to a cooling liquid return line, and the third tube is coupleable to a gas supply tube.

15. The flexible welding implement as recited in claim 14, comprising a tube support member, wherein the first tube, the second tube, and the third tube are disposed through the tube support member.

16. The flexible welding implement as recited in claim 9, comprising the handle.

17. A welding implement, comprising:
a torch head;
a plurality of tubes operable to convey fluids; and
a plurality of coils comprising a helix of non-tubular material defining an axial flow path and secured to the torch head to enable the torch head to be angled relative to the plurality of tubes and to route fluids axially through the coils;
wherein a first coil is adapted to direct a gas axially through the first coil, wherein a second coil is adapted to direct a cooling fluid to the torch head axially through the second coil, and wherein a third coil is adapted to direct the cooling fluid from the torch head axially through the third coil.

18. The welding implement as recited in claim 17, comprising a tube support member, wherein each of the plurality of tubes is disposed through the tube support member.

19. The welding implement as recited in claim 17, comprising a deformable support member extending through the plurality of coils and configured to retain a user-determined position of the torch head.

20. The welding implement as recited in claim 19, wherein the deformable support member comprises a plurality of wires braided together.

21. A welding implement, comprising:
a torch head;
a plurality of tubes operable to convey fluids;
a plurality of coils comprising a helix of non-tubular material defining an axial flow path and secured to the torch head to enable the torch head to be angled relative to the plurality of tubes and to route fluids axially through the coils;
a deformable support member extending through the plurality of coils and configured to retain a user-determined position of the torch head, wherein the deformable support member comprises a plurality of wires braided together.

* * * * *